Feb. 20, 1962     S. A. COGSDILL     3,021,733
CUTTING TOOL
Filed Aug. 7, 1957     3 Sheets-Sheet 3
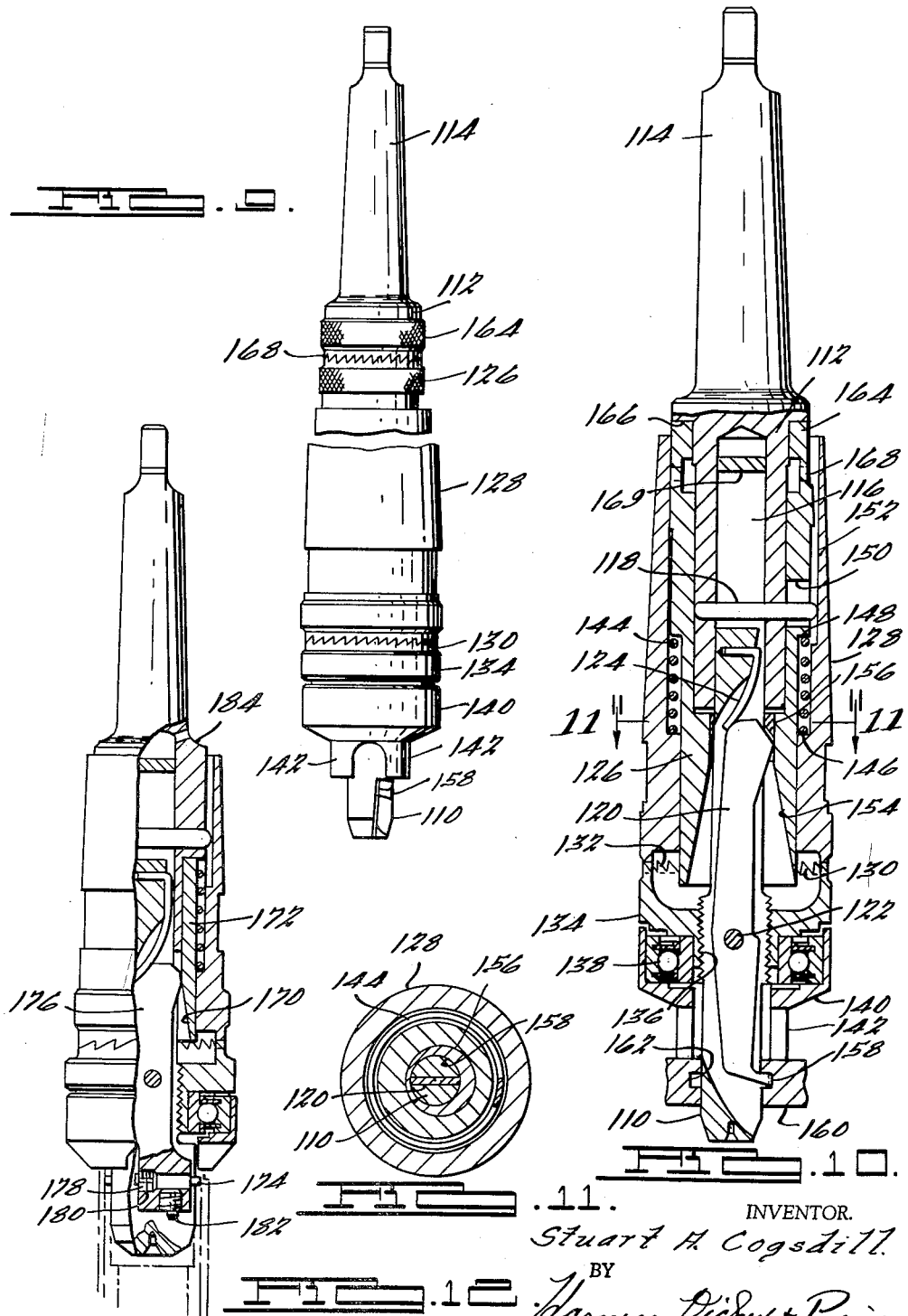
INVENTOR.
Stuart A. Cogsdill
BY
Harness, Dickey & Pierce.
ATTORNEYS.

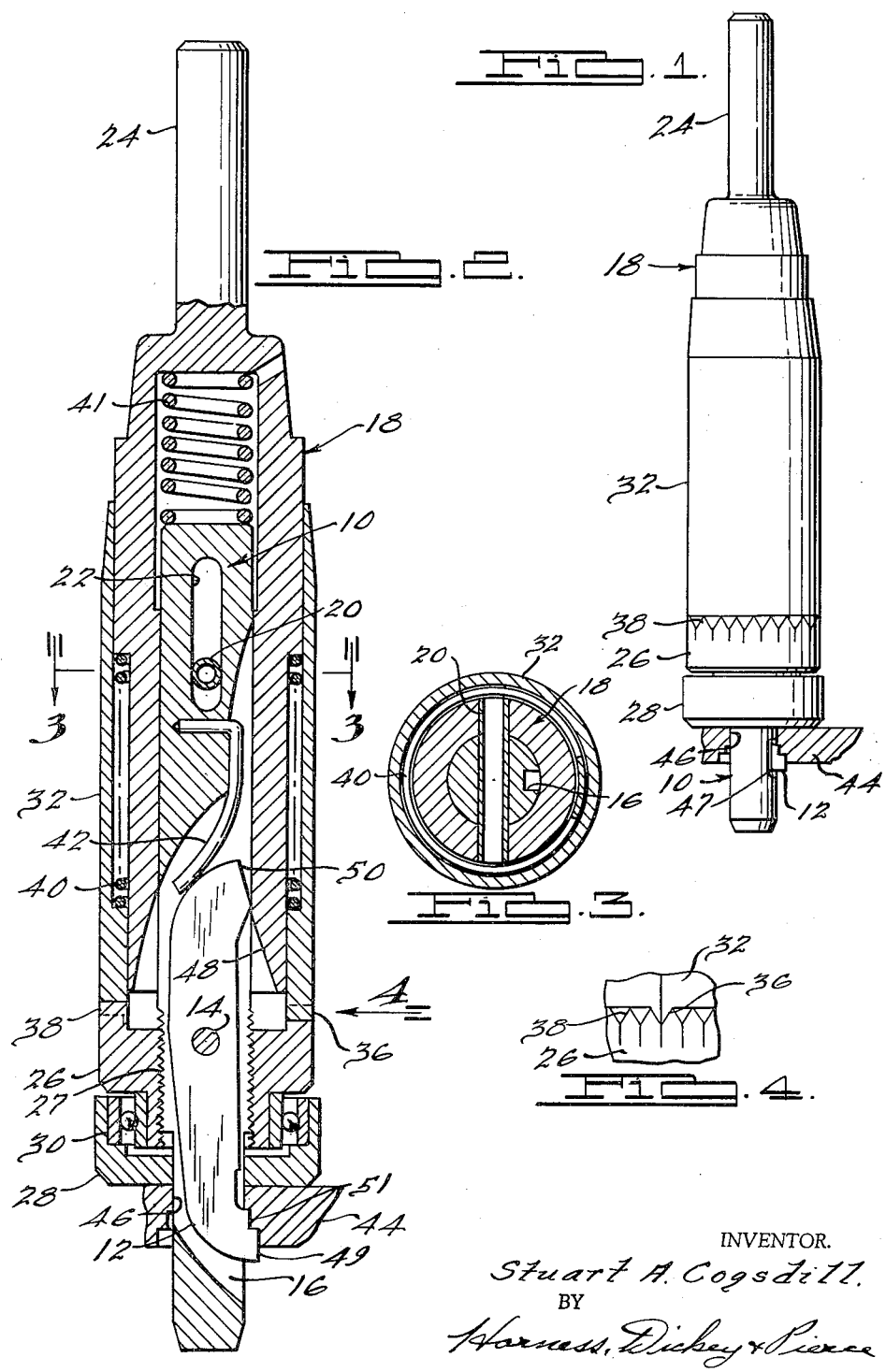

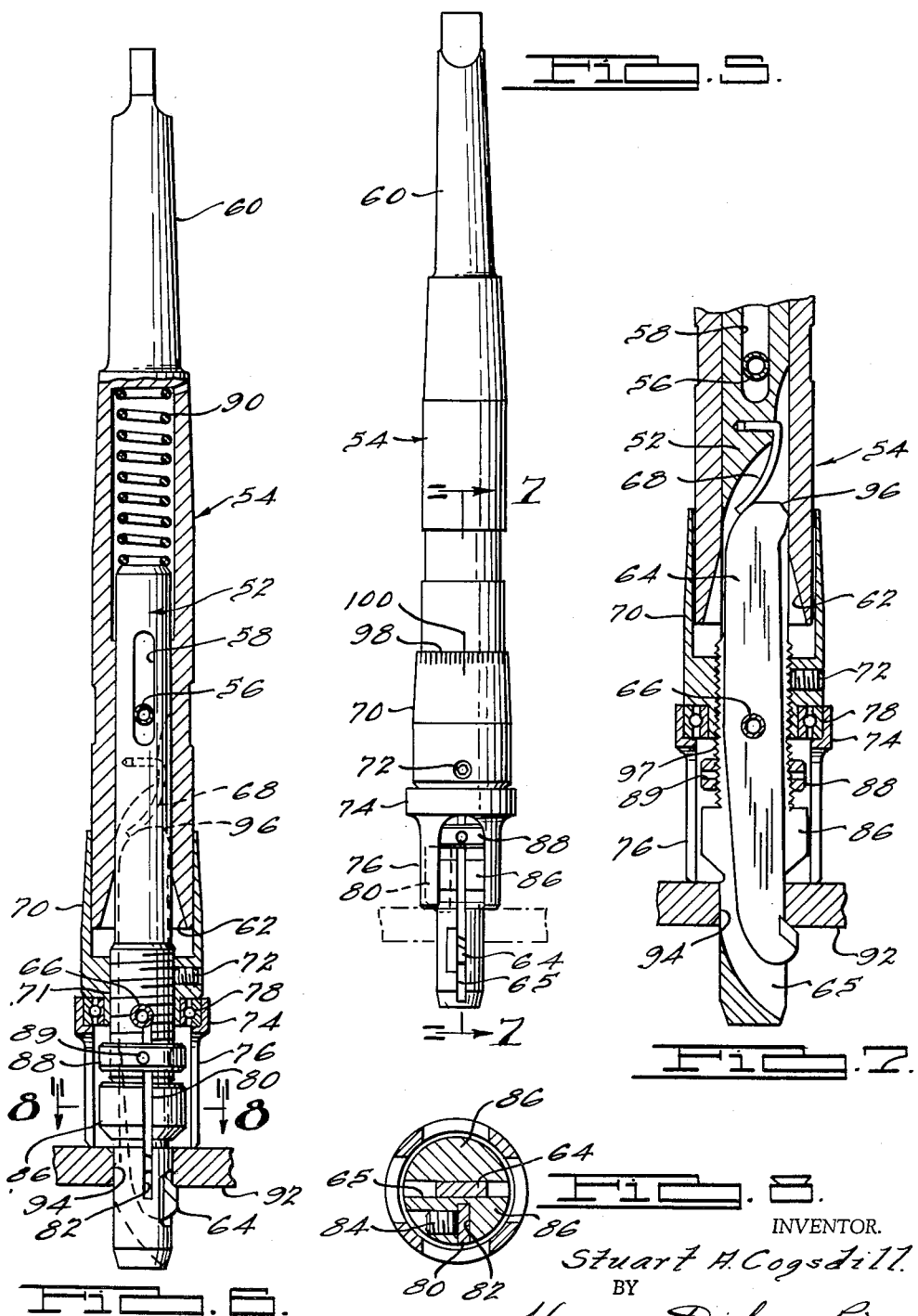

United States Patent Office 3,021,733
Patented Feb. 20, 1962

3,021,733
CUTTING TOOL
Stuart A. Cogsdill, Orchard Lake, Mich., assignor to Cogsdill Tool Products, Inc., Oak Park, Mich., a corporation of Michigan
Filed Aug. 7, 1957, Ser. No. 676,840
7 Claims. (Cl. 77—58)

This invention relates to cutting tools and more particularly to a cutting tool for performing cutting operations on a bore of a workpiece.

It is one object of the invention to provide a cutting tool having a movably mounted cutting blade for machining a bore of a workpiece.

It is another object of the invention to provide a cutting tool having a fixed cutting blade in combination with a pivotally mounted cutting blade for chamfering both ends of a bore in a workpiece in one operation.

It is a further object of the invention to provide a cutting tool having an adjustable stop collar thereon for positioning a fixed and a pivotally mounted cutting tool relative to a workpiece.

It is a still further object of the invention to provide a cutting tool for machining a bore of a workpiece having an override feature that eliminates tool breakage.

It is a still further object of the invention to provide a cutting tool for machining a bore of a workpiece wherein a cutting blade is pivoted into cutting relation with the bore by a camming sleeve which can advance beyond a predetermined point without increasing the depth of cut of the cutting blade to provide an override feature.

It is a still further object of the invention to provide a cutting tool for machining a bore of a workpiece wherein the depth of cut may be adjusted.

It is a still further object of the invention to provide a cutting tool for machining a bore of a workpiece wherein the cutting blade is adapted to be pivoted into cutting relation with the bore by a camming sleeve which is rotatable to permit variation of the amount which the cutting blade is pivoted.

It is a still further object of the invention to provide a cutting tool for machining a bore of a workpiece wherein a cutting blade having a cutting edge movably mounted on the lower end thereof is adapted to be pivoted into cutting relation with the bore by a camming surface, the movably mounted cutting edge being adjustable to vary the depth of cut.

Other objects and features of novelty of the present invention will be specifically pointed out or otherwise become apparent when referring, for a better understanding of the invention, to the following description taken in conjunction with the accompanying drawings, wherein:

FIGURE 1 is an elevational view of the cutting tool of the present invention in cutting position;

FIG. 2 is an enlarged sectional view of the cutting tool illustrated in FIG. 1;

FIG. 3 is a sectional view of the cutting tool illustrated in FIG. 2, taken along the line 3—3 thereof;

FIG. 4 is a broken view of the cutting tool illustrated in FIG. 2, when viewed in the direction of the arrow 4 thereof;

FIG. 5 is an elevational view of a cutting tool in cutting position illustrating another form of the present invention;

FIG. 6 is an enlarged sectional view of the cutting tool illustrated in FIG. 5;

FIG. 7 is an enlarged sectional view of the cutting tool illustrated in FIG. 5, taken along the line 7—7 thereof;

FIG. 8 is a sectional view of the cutting tool illustrated in FIG. 6, taken along the line 8—8 thereof;

FIG. 9 is a broken elevational view of a cutting tool in cutting position illustrating still another form of the invention;

FIG. 10 is an enlarged sectional view of the structure illustrated in FIG. 9;

FIG. 11 is a sectional view of the structure illustrated in FIG. 10, taken along the line 11—11 thereof; and FIG. 12 is a broken elevational view of a cutting tool in cutting position illustrating still another form of the invention.

Referring to FIGS. 1 and 2, a cutting tool embodying features of the present invention is comprised of a spindle 10 having a cutting blade 12 pivotally mounted within a slot 16 in the lower portion thereof by a pin 14. A shank 18 is slidably keyed to the upper end of the spindle 10 by a tubular pin 20 and an elongated slot 22, as is most clearly shown in FIG. 3. The upper end 24 of the shank 18 is adapted to fit within a driving arbor.

An adjustable collar 26 is screwed on threaded portion 27 of the spindle 10 and a ball bearing 30 is press fit on the lower end thereof with a rotary stop collar 28 press fit on the ball bearing. A sleeve 32 is slidably keyed to the shank 18 by a key (not shown) and has a tooth 36 which engages one of a plurality of serrations 38 on the upper end of the adjustable collar 26, as most clearly shown in FIG. 4. A spring 40 is disposed between shoulders on the sleeve 32 and the shank 18 to urge the tooth 36 into engagement with one of the serrations 38 and to resist the downward advancement of the shank 18 relative to the sleeve 32. If desired, a spring 41 may be disposed between the upper end of the spindle 10 and the shank 18 for a purpose which will be described later, but for the embodiment being described it is not necessary. A spring 42 is mounted in the slot 16 of the spindle 10 with one end thereof bearing against the upper end of the cutting blade 12 to pivot it in a clockwise direction.

In operation, the cutting tool is advanced and rotated by the driving arbor until the rotary stop collar 28 abuts against a workpiece 44 to position the cutting blade 12 relative to a bore 46 in the workpiece. Continued downward advancement of the arbor advances the shank 18 relative to the spindle 10 and a tapered surface 48 on the lower end of the shank cams the cutting blade 12 in a counterclockwise direction to move cutting edges 49 and 51 into cutting position, as shown in FIG. 2, to counterbore the lower end of the bore 46. It will be observed that the shank 18 may continue to advance relative to the spindle without increasing the depth of cut of the cutting blade since the camming action ends as soon as the tapered surface 48 loses contact with the upper end of the cutting blade. This provides a valuable override feature which prevents tool breakage in the event the driving arbor advances too far.

When the cutting action is completed, the arbor is retracted but during the initial portion of the upward movement, the spindle 10, the cutting blade 12, the tubular collar 26, the rotary collar 28, and the sleeve 32 will remain stationary until the pin 20 engages the upper end of the slot 22 in the spindle 10 because the spring 40 is under compression. At this point, the tapered surface 48 will be in abutting relation with a tapered surface 50 on the upper end of the cutting blade 12 because the spring 42 urges the cutting blade 12 in a clockwise direction. When the cutting blade 12 is pivoted clockwise by the spring 42 as the surface 48 moves upwardly, the cutting edges 49 and 51 are retracted to a position entirely within the slot 16 of the spindle 10 and further upward movement of the driving arbor retracts the entire cutting tool from the bore 46. As most clearly shown in FIG. 1, the spindle 10 is relieved as at 47 to prevent the clogging of the cutting chips.

To adjust the position of the rotary stop collar 28 relative to the spindle 10 to position the cutting edges 49 and 51 relative to the workpiece, the sleeve 32 is moved upwardly relative to the shank 18 against the action of the spring 40 until the tooth 36 clears the serrations 38 on the upper end of the adjustable collar 26. The adjustable collar 26 is then rotated on the threaded portion 27 to the desired position after which the spring 40 is permitted to urge the sleeve 32 downwardly until the tooth 36 again engages one of the serrations 38 to lock the adjustable collar 26 against further rotation.

The number of serrations 38 may be correlated with the pitch of the threaded portion 27 so that rotating the collar 26 one serration relative to the tooth 36 will advance or retract the collar 26 a predetermined distance. For example, if the threaded portion 27 has twenty threads per inch and fifty serrations 38 are provided, rotation of the collar 26 one serration advances or retracts the collar 26 one-thousandth of an inch. Of course, it is obvious that other numbers of serrations may be combined with different pitches for the threaded portion 27 to vary the amount that the tubular collar 26 is advanced or retracted when rotated.

Referring to FIGS. 5 through 8, another embodiment of the present invention is shown comprising a spindle 52 having a shank 54 slidably keyed thereto by a pin 56 and an elongated slot 58 in the upper end of the spindle 52. The shank 54 has an upper end 60 adapted to fit within a driving arbor, and a tapered cam surface 62 on the lower end thereof.

As previously described, a cutting blade 64 is pivotally mounted within a slot 65 in the lower end of the spindle 52 by a pin 66, and a spring 68 is provided for pivoting the cutting blade 64 in a clockwise direction. A sleeve 70 is screwed on threaded portion 71 of the spindle 52 and a set screw 72 is provided for locking it in position. A rotary stop collar 74 having four downwardly extending projections 76 is rotatably mounted on the lower end of the sleeve 70 by a ball bearing 78, the projections 76 permitting ready access to the parts adjacent thereto without having to disassemble the rotary collar 74.

A cutting blade 80 is disposed within a longitudinal slot 82 in the lower portion of the spindle 52 and is positioned therein by a set screw 84, as most clearly shown in FIG. 8. A portion 86 of the spindle 52 is made of greater diameter to provide additional support for the cutting tool 80, and a thrust collar 88 is threaded on the spindle 52 to absorb the upward thrust of the cutting blade 80 when it is cutting. Four holes 89 are provided at 90° intervals in the thrust collar 88 to permit a pin to pass through the holes aligned with the slot 65 to lock the thrust collar against rotation.

A spring 90 is disposed betwen the upper end of the spindle 52 and the shank 54, having sufficient strength to prevent relative longitudinal movement therebetween as the cutting blade 80 is cutting, and to permit relative longitudinal movement therebetween after the cutting blade 80 has completed its cut, at which point projections 76 abut against a workpiece 92.

In operation, the cutting tool is advanced by the arbor until the projections 76 of the rotary collar 74 abut against the workpiece 92, at which point the lower end of the spindle 52 extends through a bore 94 in the workpiece 92. Just before the projections 76 engage the workpiece 92, the cutting blade 80 begins to chamfer the upper end of the bore 94 and continues to chamfer until the projections 76 abut against the workpiece 92. The shank 54 will not advance relative to the spindle 52 while the cutting blade 80 is cutting because the spring 90 is strong enough to resist this relative movement. However, when the projections 76 abut against the workpiece 92, the cutting blade 80 can no longer advance and the cutting blade 64 is positioned relative to the workpiece 92. Further downward movement of the arbor advances the shank 54 relative to the spindle 52 by compressing the spring 90 and causes the tapered surface 62 on the lower end of the shank to cam the cutting blade 64 into cutting position, as shown in FIGS. 6 and 7, to chamfer the lower end of the bore 94.

Upon the completion of the cut, the arbor is retracted and, as previously described, the spindle 52 and the parts mounted thereon remain stationary due to the compression of the spring 90 until the pin 56 engages the upper end of the slot 58 in the spindle 52. When this occurs, the tapered surface 62 on the lower end of the shank will be in abutting relationship with a tapered surface 96 on the upper end of the cutting blade 64 which enables the lower end of the cutting blade 64 to retract within the spindle. As the arbor continues to move upwardly, the entire cutting tool is withdrawn until the end of the spindle 52 clears the bore 94. It will be appreciated that both ends of the bore may be machined in this manner with a relatively short length of stroke of the driving arbor, which is an extremely advantageous feature in machine tool operations.

Referring to FIG. 5, a scale 98 is shown on the upper end of the sleeve 70 which cooperates with a line 100 on the shank 54 to provide an indication of the position of the sleeve 70 and the rotary stop collar 74. As in the case of the serrations 38 in the embodiment shown in FIG. 2, the spacing between the lines on the scale 98 may be correlated with the pitch of the threaded portion 71 on the spindle so that rotation of the sleeve 70 one division relative to the line 100 advances or retracts the sleeve 70 a predetermined distance.

The cutting blade 80 may also be incorporated in the embodiment illustrated in FIG. 2 so that both ends of the bore 46 can be machined in one operation. If the cutting blade 80 is incorporated, the embodiment of FIG. 2 would operate in substantially the same manner as the embodiment of FIGS. 5, 6 and 7 with the exception that the spring 40 would have to perform the function of the spring 90 of FIG. 6. To do so, the spring 40 would have to be somewhat stronger to resist relative movement between the shank 18 and the spindle 10 until the rotary stop collar 28 abuts against the workpiece 44. It will be appreciated that any relative movement prior to the abutment of the rotary collar against the workpiece 44 would interfere with the cutting of the cutting blade 80.

If desired, the heavy-duty spring 41 may be disposed between the top of the spindle 10 and the shank 18 to prevent relative movement between the spindle and the shank while the cutting tool 80 is cutting and to permit relative movement therebetween after the rotary stop collar 28 abuts the workpiece 44. If the heavy-duty spring 41 is employed, the spring 40 need only have sufficient strength to maintain the tooth 36 in engagement with the serrations 38 on the upper end of the adjustable collar 26 to prevent the rotation of the adjustable collar.

Referring to FIGS. 9, 10 and 11, another form of the invention is illustrated wherein a spindle 110 is slidably disposed within the lower end of a shank 112 having an upper end 114 adapted to fit within a driving arbor. The spindle 110 has a diametrical slot 116 extending substantially the length thereof and is keyed to the shank 112 by a pin 118 passing through the slot 116 and the wall of the shank.

A cutting blade 120 is pivotally mounted within the lower end of the slot 116 by a pin 122. A spring 124 is mounted on the spindle 110 and bears against the upper end of the cutting blade 120 to urge it clockwise, as viewed in FIG. 10, against the inner surface of a camming sleeve 126 slidably disposed on the lower end of the shank 112.

A sleeve 128 is slidably disposed over the camming sleeve 126 and has teeth 130 on the lower end thereof which cooperate with teeth 132 on the upper end of an adjustable collar 134 screwed onto thread 136 on the spindle 110. A ball bearing 138 is press fit on the lower end of the adjustable collar 134 and a rotary stop collar 140 having projecting skirts 142 is press fit on the ball bearing 138.

A spring 144 is disposed between an internal shoulder 146 on the sleeve 128 and an external shoulder 148 on the camming sleeve 126 to urge the sleeves apart. It will be observed that one end of the pin 118 extends through a slot 150 in the wall of the camming sleeve 126 and into an axially extending slot 152 in the wall of the sleeve 128. In this manner the sleeve 128 is keyed to the shank 112 and the spindle 110 by the pin 118 but the camming sleeve 126 is permitted to rotate through 180° relative to these elements because the slot 150 extends through 180° circumferentially about the camming sleeve 126.

It will be observed that the axis of a tapered surface 154 on the lower end of the shank 112 is displaced to the right of the axis of the spindle 110, as well as the remainder of the cutting tool, and that a bushing 156 having an off-center aperture 158 therein is provided for supporting the spindle 110. This is most clearly illustrated in FIG. 11.

The camming sleeve 126 is adapted to be moved axially relative to the spindle 110 to cam the cutting blade 120 as previously described so that a cutting edge 158 on the lower end of the cutting blade 120 can be pivoted into cutting relation with the workpiece 160 to cut an annular groove 162, or the like, therein. By mounting the axis of the tapered surface 154 off-center relative to the axis of the spindle 110, the camming sleeve 126 may be rotated through 180° relative to the spindle 110 to vary the amount which the cutting blade 120 is pivoted in a counterclockwise direction, as viewed in FIG. 10, which, of course, in turn controls the depth of cut of the cutting edge 158. The camming sleeve 126, of course, can rotate through 180° relative to the spindle 110, shank 112, and sleeve 128, because of the circumferential slot 150 in the wall thereof.

If a greater variation in the depth of cut is desired, the cutting tool can be disassembled and reassembled with the camming element rotated through 180° so that the slot 150 would be on the left, as viewed in FIG. 10, and the pin 118 would therefore project to the left so that the other half of the tapered surface 154 would be in position to engage the upper end of the cutting blade 120 to provide a different amount of variation in the cutting depth.

It will be observed that a ring 164 is press fit on the shank 112 against a shoulder 166 thereon and that the lower end of the ring 164 has a plurality of teeth 168 which cooperate with the plurality of teeth on the upper end of the camming sleeve 126 to prevent the rotation of the camming sleeve when the teeth are engaged. It is apparent that the teeth are maintained in engagement by the force exerted by the spring 144.

Therefore, to vary the depth of cut of the cutting edge 158, the camming sleeve 126 is pulled downwardly against the action of the spring 144 so that the teeth 168 are disengaged, after which the camming sleeve 126 may be rotated relative to the spindle 110 to position the desired portion of the tapered surface 154 relative to the upper end of the cutting blade 120. The spring 144 may then be permitted to urge the camming sleeve 126 upwardly so that the teeth 168 re-engage to lock the camming sleeve in this position. Also, a predetermined number of teeth 168 may be provided and correlated with the tapered surface 154 to provide an indication of the change in depth of cut of the cutting edge 158. Once this adjustment has been made, the cutting tool operates in substantially the same manner as the cutting tool illustrated in FIG. 2.

To vary the position of the cutting edge 158 relative to the workpiece 162, the adjustable stop collar 134 may be adjusted in a similar manner as the adjustable stop collar 126 of FIG. 2. This comprises simply lifting the sleeve 128 against the action of the spring 144 to disengage the teeth 130 and 132 to permit the adjustable stop collar 134 to be rotated on the thread 136 of the spindle 110. This changes the position of the skirts 142 relative to the spindle 110 to vary the amount the spindle may enter the bore of the workpiece 160 before the skirts 142 strike the workpiece to halt the downward advancement of the spindle. Continued advancement of the driving arbor will then advance the camming sleeve 126 relative to the spindle 110 and the sleeve 128 by compressing spring 144. As previously described, this cams the upper end of the cutting blade 120 counterclockwise, as viewed in FIG. 10, to urge the cutting edge 158 into cutting relation with the workpiece 160.

When the driving arbor is retracted, the spindle 110 and sleeve 128 will remain stationary due to the force exerted by the spring 144, and the camming sleeve 126 will retract with the shank 112 until the pin 118 strikes upper end 169 of the slot 116. At this time, the cutting edge 158 will be completely retracted within the spindle 110 and continued upward movement of the driving arbor will withdraw the spindle 110 from the bore of the workpiece 160.

Referring to FIG. 12, another form of the invention is comprised of elements similar to those illustrated in FIGS. 9 through 11 with the exception that the axis of tapered surface 170 on the lower end of a camming sleeve 172 is not displaced from the axis of the remainder of the cutting tool. Instead, the variation in the depth of cut of a cutting edge 174 mounted on the lower end of cutting blade 176 by a body 178 is obtained by screwing the body 178 into a threaded aperture 180 in the lower end of the cutting blade 176 so that the cutting edge 174 can be moved laterally. A set screw 182 also screwed into the lower end of the cutting blade 176 so as to bear against the body 178 is provided for locking the body 178 in the desired position.

In this manner, the depth of cut may be very simply adjusted by moving the body having the cutting edge without having to change the position of the tapered surface 170 relative to the upper end of the cutting blade 176. Therefore, with this construction, the camming sleeve 172 need not be mounted for rotation relative to shank 184 which simplifies the construction. Instead, the camming sleeve may be press fit or otherwise securely mounted on the shank, or the lower end of the shank itself may have the tapered surface 170 formed thereon, as illustrated in FIG. 2.

What is claimed is:

1. A cutting tool adapted to be fitted to a driving arbor for machining a bore of a workpiece comprising, a spindle, a cutting blade pivotally mounted within the lower end of the spindle, stop means for positioning the spindle relative to the workpiece, a sleeve extending over the spindle having a cam surface on the lower end thereof adapted to cam the cutting blade into cutting position with the bore when the shank advances relative to the spindle, said cam surface having an axis displaced from the axis of the cutting tool, and means for slidably keying the sleeve to the shank and spindle to permit limited relative rotational and longitudinal movement therebetween to enable the sleeve to be rotated to vary the depth of cut of the cutting blade.

2. A cutting tool for machining a bore of a workpiece comprising, a spindle, a cutting blade pivotally mounted within the lower end of the spindle, a shank slidably keyed to the upper end of the spindle and having the upper end thereof adapted to fit within a driving arbor, a camming sleeve extending over the spindle and the lower end of the shank and having a camming surface on the lower end thereof which is axially displaced from the axis of the spindle, said camming sleeve being adapted to pivot the cutting blade into cutting position when it is advanced relative to the spindle by the shank, stop means for positioning the spindle relative to the workpiece, and means for mounting the camming sleeve so that it may be rotated relative to the shank and spindle to change the portion of the cammed surface engaging the cutting blade to control the depth of cut of the cutting blade.

3. A cutting tool for machining a bore in a workpiece comprising, a spindle, a shank cooperatively mounted on the upper end of the spindle so as to prevent relative rotation and permit limited relative longitudinal movement therebetween, the upper end of said shank being adapted to fit within a driving arbor, a cutting blade pivotally mounted within the lower end of the spindle, stop means for positioning the spindle relative to said bore, a camming sleeve extending over the spindle and mounted on the lower end of the shank so as to permit limited longitudinal and rotational movement therebetween, the lower end of said sleeve having a frusto conical cam surface with the axis thereof displaced from the axis of the sleeve, and spring means disposed between the camming sleeve and the stop means, whereby advancement of the driving arbor advances the camming sleeve relative to the spindle to pivot the cutting blade into cutting position and rotation of the camming sleeve changes the depth of cut of the cutting blade.

4. A cutting tool for machining a bore of a workpiece comprising a spindle having a cutting blade pivotally mounted within the lower end thereof, a shank slidably mounted on the upper end of the spindle and having the upper end thereof adapted to fit within a driving arbor, collar means mounted on the lower end of the spindle for positioning the spindle relative to the workpiece, a camming sleeve having serrations on the upper end and a cam surface on the lower end, said cam surface having the axis thereof displaced from the axis of the cutting tool, said camming sleeve being mounted on the lower end of the shank in a manner to permit limited longitudinal and rotational movement relative thereto, said teeth being adapted to releasably engage suitable teeth on the shank to prevent relative rotation therebetween, a sleeve extending over the cutting tool and releasably engaging said collar means, and spring means disposed between said sleeve and the camming sleeve to urge them apart.

5. In a cutting tool for machining the bore of a workpiece, a spindle, a member carried by said spindle and movable axially thereof, and a pivoted cutting blade carried by said member, said spindle having an internal conical camming surface below an extending cylindrical surface, the axes of said surfaces being offset relative to the axis of the member whereby the camming surface moves the blade outwardly to a degree depending upon its adjusted rotative position while the cylindrical surface permits overrun after the cutting edge has reached said adjusted cutting position.

6. In a cutting tool for machining the bore of a workpiece, a hollow spindle having camming surfaces on the lower inner face thereof, a member supported by said spindle for movement relative thereto, and a blade pivoted to said member having an end engageable by said surfaces, one of said surfaces being of conical shape at the lower end and of cylindrical shape inwardly thereof and being offset from the center of the member whereby the actual axial movement between the spindle and member produces the camming of the blade into cutting position and the relative rotation therebetween adjusts the cutting edge to accurate cutting position.

7. In a cutting tool for machining the bore of a workpiece, a hollow spindle having camming surfaces on the lower inner face thereof, a member supported by said spindle for movement relative thereto, and a blade pivoted to said member having an end engageable by said surfaces, one of said surfaces being conical to produce a camming action when said spindle and member are moved axially relative to each other, the other surface in extension of said conical surface being cylindrical with its axis offset relative to the central axis of the member to produce a camming action when relative rotation occurs between said spindle and member while permitting said surface to override the blade during the further longitudinal movement between said spindle and member.

References Cited in the file of this patent
UNITED STATES PATENTS

| | | |
|---|---|---|
| 2,182,770 | Woodcock | Dec. 5, 1939 |
| 2,706,421 | Fried et al. | Apr. 19, 1955 |
| 2,716,360 | Cogsdill et al. | Aug. 30, 1955 |
| 2,773,402 | Edens | Dec. 11, 1956 |